Figure 1:
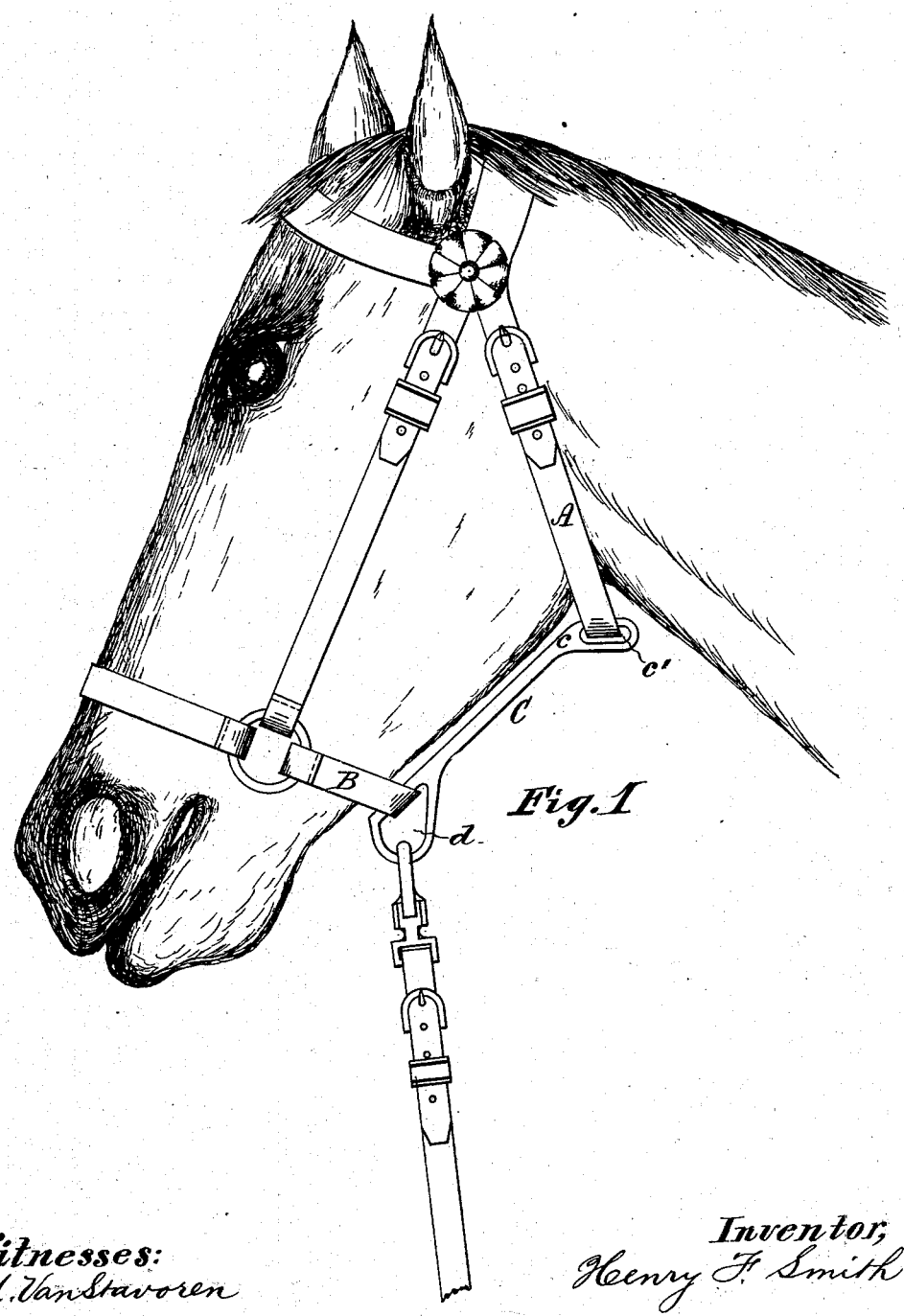

(No Model.) 2 Sheets—Sheet 1.

H. F. SMITH.
THROAT TUG FOR BRIDLES AND HALTERS.

No. 249,412. Patented Nov. 8, 1881.

Witnesses:
S. J. VanStavoren
W. H. Norris.

Inventor,
Henry F. Smith
By Connolly Bros.
Attorneys.

(No Model.) 2 Sheets—Sheet 2.
H. F. SMITH.
THROAT TUG FOR BRIDLES AND HALTERS.
No. 249,412. Patented Nov. 8, 1881.
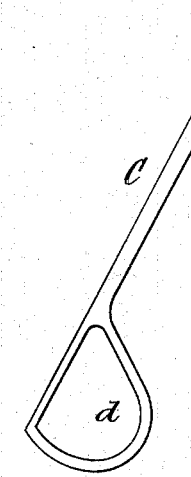
Fig. 2.
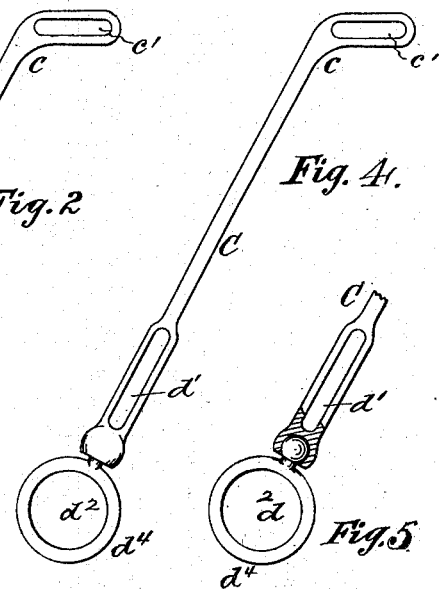
Fig. 4.
Fig. 5.
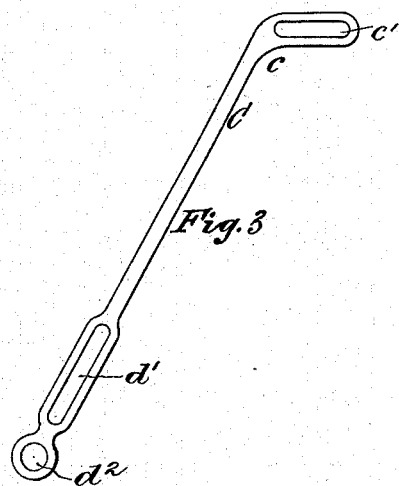
Fig. 3.
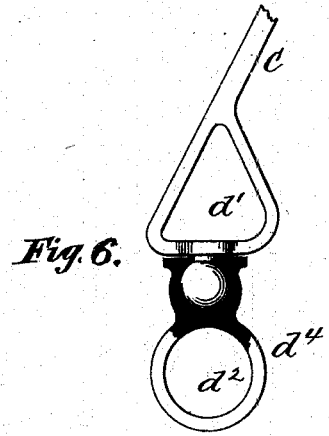
Fig. 6.
Witnesses:
S. J. Van Stavoren
W. H. Norris
Inventor,
Henry F. Smith
By Connolly Bros.
Attorneys.

UNITED STATES PATENT OFFICE.

HENRY F. SMITH, OF PHILADELPHIA, PENNSYLVANIA.

THROAT-TUG FOR BRIDLES AND HALTERS.

SPECIFICATION forming part of Letters Patent No. 249,412, dated November 8, 1881.

Application filed October 10, 1881. (No model.)

*To all whom it may concern:*

Be it known that I, HENRY F. SMITH, a citizen of the United States, residing at Philadelphia, in the county of Philadelphia and State of Pennsylvania, have invented certain new and useful Improvements in Throat-Tugs for Bridles and Halters, of which the following is a specification, reference being had to the accompanying drawings, wherein—

Figure 1 is a representation of a halter in position upon a horse's head, with my improved throat-tug applied thereto. Fig. 2 is a side view of one form of tug embodying part of my invention. Fig. 3 is a similar view of a tug, of slightly modified construction. Figs. 4, 5, and 6 are side views of other modifications, illustrating the swiveled eye or loop, Figs. 5 and 6 being mutilated views, partly in section.

My invention has relation to bridles and halters, and has for its object to provide secure means for hitching, and to prevent a horse from slipping off the bridle or halter over his head, and also to prevent the snarling of the picket-rope, thereby avoiding the entanglement of said rope with the legs of the picketed animal.

My invention consists of a rigid metallic brace, tug, or shank, of peculiar construction, as hereinafter described and claimed, designed to connect the throat-latch and chin-strap of a halter or bridle, and to afford means for the attachment of a hitching hook, strap, chain, or picket-rope.

Referring to the accompanying drawings, A and B represent, respectively, the throat-latch and chin-strap of a bridle or halter.

C represents a metallic bar forming a throat-tug and serving to connect the parts A and B, occupying a position under the gullet and back of the jaw of a horse, to which the bridle or halter embodying it is applied.

The upper end of the throat-tug is formed, bent, or inclined rearwardly at an angle to the body of the bar, as shown at *c* in Figs. 1, 2, 3, 4, and 5, this bent or inclined end having an opening, *c'*, for the passage of the throat-latch.

The lower end of the bar will in all cases be formed or provided with at least one opening, and in some cases two. Where only one opening is formed it should be sufficiently large to admit the passage of the chin-strap and also to afford means for the attachment by tying, buckling, or hooking of a hitching hook, strap, chain, or picket-rope.

Figs. 1 and 2 show the tug formed with a single large opening, *d*, through which the chin-strap passes, and which also serves as a means for the attachment of the hitching connections. Fig. 3 shows the tug formed with two openings at the lower end, one, *d'*, for the chin-strap and the other, *d²*, for the hitching-devices. Both these openings may be passages through the same bar, but the opening for the hitching devices may be in a ring not integral with the tug, but connected therewith.

The ring shown at *d⁴* in Figs. 4, 5, and 6 may be connected to the bar by a swivel-joint of any suitable construction—as a swivel-pin or rivet and eye, or a ball-and-socket joint, as shown in Figs. 4, 5, and 6, respectively. Owing to the rigidity of the tug it will keep the throat-latch and chin-strap always at a due relative distance, which a flexible strap or rope in the same position will not do. It will thus facilitate the putting on of the bridle or halter on a horse, and will also prevent the animal from slipping the same off his head. The upper inclined or bent end, as shown in Figs. 1, 2, 3, and 4, permits the throat-latch to be attached to the tug without producing any torsion of the former, thus producing a better and more comfortable fit for the head-gear than heretofore. The swivel-ring on the lower end of the tug avoids twisting of the hitching hook, strap, chain, or picket-rope. The gravity of either of these turns the swivel with the animal's movements and prevents the entangling of the picket-rope with its legs while grazing.

By preference the axle or axial line of the swivel is inclined, or at an angle with respect to the body, as shown in Fig. 6, so that the ring will stand perpendicularly when the bar is in its normal inclined position.

What I claim as my invention is as follows:

1. A metallic throat-tug having its upper end bent or inclined rearwardly with respect to the stock or body, and provided with an opening for the passage of a bridle or halter throat-latch, substantially as set forth.

2. A metallic throat-tug having openings at either end for the passage of the throat-latch and nose-strap, respectively, and a swiveled eye or loop for the attachment of a hitching-strap, substantially as set forth.

In testimony that I claim the foregoing I have hereunto set my hand this 17th day of November, 1880.

HENRY F. SMITH.

Witnesses:
S. J. VAN STAVOREN,
CHAS. F. VAN HORN.